(12) United States Patent
Matsuo

(10) Patent No.: US 8,245,040 B2
(45) Date of Patent: Aug. 14, 2012

(54) SECRET AUTHENTICATION SYSTEM

(75) Inventor: Masakatsu Matsuo, Fukuoka (JP)

(73) Assignee: Panasonic Corporation, Osaka (JP)

( * ) Notice: Subject to any disclaimer, the term of this patent is extended or adjusted under 35 U.S.C. 154(b) by 620 days.

(21) Appl. No.: 12/425,677

(22) Filed: Apr. 17, 2009

(65) Prior Publication Data
US 2009/0276621 A1 Nov. 5, 2009

(30) Foreign Application Priority Data

Apr. 30, 2008 (JP) ................................ 2008-118742

(51) Int. Cl.
*H04L 9/32* (2006.01)
*G06F 17/30* (2006.01)
*G06F 15/16* (2006.01)

(52) U.S. Cl. ........ 713/168; 713/155; 713/172; 713/169; 713/182; 713/184; 713/185; 713/186

(58) Field of Classification Search .................. 713/155, 713/168, 169, 172, 182, 184–186
See application file for complete search history.

(56) References Cited

U.S. PATENT DOCUMENTS

| 4,322,577 | A | * | 3/1982 | Brandstrom | ..................... 380/37 |
| 4,605,820 | A | * | 8/1986 | Campbell, Jr. | ................... 705/71 |
| 4,759,063 | A | | 7/1988 | Chaum | |
| 5,796,832 | A | * | 8/1998 | Kawan | ............................ 705/65 |
| 7,945,776 | B1 | * | 5/2011 | Atzmony et al. | ............. 713/165 |
| 2004/0006713 | A1 | * | 1/2004 | Minemura | ..................... 713/201 |
| 2004/0187018 | A1 | * | 9/2004 | Owen et al. | ..................... 713/200 |
| 2005/0138397 | A1 | | 6/2005 | Kusudo et al. | |
| 2005/0138401 | A1 | | 6/2005 | Terao et al. | |
| 2006/0015746 | A1 | | 1/2006 | Kusudo et al. | |
| 2006/0080732 | A1 | | 4/2006 | Ohkubo et al. | |
| 2006/0143450 | A1 | * | 6/2006 | Airody Udupa et al. | ...... 713/168 |
| 2007/0118891 | A1 | * | 5/2007 | Buer | ................................. 726/8 |
| 2007/0133807 | A1 | * | 6/2007 | Lee et al. | ........................ 380/282 |
| 2007/0194879 | A1 | * | 8/2007 | Backes et al. | .................. 340/5.8 |
| 2007/0208939 | A1 | | 9/2007 | Iwamoto et al. | |

(Continued)

FOREIGN PATENT DOCUMENTS

| JP | 2004-317764 A | 11/2004 |
| JP | 2007-293787 A | 11/2007 |
| WO | 2005-031579 A1 | 4/2005 |

OTHER PUBLICATIONS

Schneier, Bruce. Applied Cryptography, 1996 John Wiley & Sons, Inc., pp. 31-32, 445.*

(Continued)

*Primary Examiner* — Michael Simitoski
(74) *Attorney, Agent, or Firm* — Greenblum & Bernstein, P.L.C.

(57) ABSTRACT

An authenticated apparatus generates scrambled data from key data and authentication data, such that another key data, which configures the product data, or authentication data is obtained through back-calculation of the product data by using the authentication data or key data, the scrambled data including the product data and the like generated by multiplying the authentication data indicative of the authenticated apparatus's or a user's authenticity by the key data. The authenticated apparatus generates verification data through an operation of the authentication data, key data, or scrambled data, and transmits the verification data and scrambled data to an authenticating apparatus. The authenticating apparatus then verifies authenticity of the authenticated apparatus based on the verification data and scrambled data received from the authenticated apparatus and each authenticated apparatus's or each user's authentication data stored in the authenticating apparatus.

2 Claims, 13 Drawing Sheets

U.S. PATENT DOCUMENTS

| | | | |
|---|---|---|---|
| 2007/0229771 A1* | 10/2007 | Fujimori | 353/40 |
| 2007/0261108 A1 | 11/2007 | Lee et al. | |
| 2008/0046039 A1* | 2/2008 | Corndorf | 607/60 |
| 2008/0106386 A1* | 5/2008 | Li et al. | 340/10.5 |
| 2008/0178263 A1 | 7/2008 | Tanaka | |
| 2009/0094690 A1 | 4/2009 | Hayashi | |

OTHER PUBLICATIONS

Piramuthu, Selwyn. "Protocols for RFID tag/reader authentication", 2007.*

English language Abstract of JP 2007-293787 A, Nov. 8, 2007.

English language Abstract of JP 2004-317764 A, Nov. 11, 2004.

U.S. Appl. No. 12/424,809 to Matsuo, which was filed on Apr. 16, 2009.

U.S. Appl. No. 12/464,436 to Matsuo, which was filed on May 12, 2009.

U.S. Appl. No. 12/427,979 to Matsuo, which was filed on Apr. 22, 2009.

* cited by examiner

SECRET AUTHENTICATION SYSTEM

CROSS-REFERENCE TO RELATED APPLICATIONS

The present application claims priority under 35 U.S.C. §119 of Japanese Application No. 2008-118742 filed on Apr. 30, 2008, the disclosure of which is expressly incorporated by reference herein in its entirety.

BACKGROUND OF THE INVENTION

1. Field of the Invention

The present invention relates to a secret authentication system in which an authenticated apparatus notifies an authenticating apparatus of authentication data, so that authentication is performed while others are kept from knowing the data.

2. Description of Related Art

Systems providing a variety of services from a server to terminals connected via a network have rapidly been spreading recently, represented as Internet commerce systems, including Internet banking and Internet shopping. In the systems, which require an authentication system that verifies whether or not users are properly registered, authentication data, such as passwords, are transmitted on the network. Due to the nature of the systems, various technologies are known to prevent improper acts of making illicit gains through spoofing by using authentication data stolen from proper users (refer to Related Art 1, for example).

In addition, contactless IC cards functioning as electronic money have quickly been spreading recently. Contactless IC cards and RFID tags are getting used in entry control systems and merchandise control systems. In the systems of this type using RFID devices, it is necessary to prevent improper acts of making illicit gains through spoofing by using skimmed authentication data. Some schemes are known in order to increase security of the RFID devices, including a randomized hash lock scheme, a hash chain scheme (refer to Related Art 2), and a re-encryption scheme (refer to Related Art 3).

[Related Art 1] Japanese Patent Laid-open Publication No. 2007-293787

[Related Art 2] Japanese Patent PCT-publication of PCT International Application No. 2005-031579

[Related Art 3] Japanese Patent Laid-open Publication No. 2004-317764

A variety of conventional technologies are able to increase secrecy of authentication data by employing complex calculation processes, but unable to sufficiently satisfy cost reduction demands since the technologies require high-speed computation devices that increase costs. It is thus desired to provide a technology capable of achieving both cost reduction and high secrecy. It is further desired in secret authentication systems to achieve a forward secure scheme, which prevents authentication information (authentication parties, authentication time and date, and the like) from being searched from the past; and a backward secure scheme, which prevents authentication information from being searched in the future.

SUMMARY OF THE INVENTION

The present invention addresses the above-described problems in the conventional technologies. An advantage of the present invention is to provide a secret authentication system configured to reduce operation loads, and hence costs, while ensuring high secrecy. In addition, the present invention provides a secret authentication system that enables a forward secure scheme and backward secure scheme.

In the secret authentication system according to the present invention, an authenticated apparatus generates scrambled data from key data and authentication data, the scrambled data including product data and the like generated by multiplying the authentication data indicative of the authenticated apparatus's or a user's authenticity by the key data. Another key data, which configures the product data, or authentication data is obtained through back-calculation of the product data b) using the authentication data or key data. In addition, the authenticated apparatus generates verification data through an operation of the authentication data, key data, or scrambled data, the operation at least making back-calculation difficult for a third party. The verification data and scrambled data are transmitted to an authenticating apparatus. The authenticating apparatus then verifies authenticity of the authenticated apparatus based on the verification data and scrambled data received from the authenticated apparatus, and each authenticated apparatus's or each user's authentication data stored in the authenticating apparatus. Herein, the authentication data is indicative of authenticity of the authenticated apparatus or a user who operates the authenticated apparatus. Specifically, the authentication data refers to a password assigned to the authenticated apparatus or a user who operates the authenticated apparatus, biometrics information relating to a user who operates the authenticated apparatus, and the like.

According to the present invention, even when an intermediary, who intervenes in communication between the authenticated apparatus and the authenticating apparatus, unjustly intercepts the scrambled data and verification data transmitted from the authenticated apparatus to the authenticating apparatus, the intermediary is not able to calculate the authentication data or key data using the verification data. The reason for this is because the verification data is generated by processing the scrambled data through an operation that makes back-calculation difficult for a third party, the scrambled data having been generated from the key data and authentication data. In addition, the authentication data cannot be calculated using the scrambled data without the key data. The key data cannot be calculated using the scrambled data without the authentication data. Thereby, high secrecy can be ensured. Moreover, since no further processing is required in the authenticated apparatus and authenticating apparatus besides a multiplication operation and an inverse operation thereof, operation loads and hence costs are reduced.

According to a first aspect of the present invention provided to address the above-described problems, a secret authentication system includes a client and a server authenticating the client. The client has a client authentication data memory, a client key data memory, a client encrypter, and a client verification data generator. The client authentication data memory stores client authentication data M indicative of authenticity of the client. The client key data memory stores client key data S encrypting the client authentication data M stored in the client authentication data memory. The client encrypter performs an operation of the client authentication data M stored in the client authentication data memory and the client key data S stored in the client key data memory so as to output client encrypted data M×S. The client verification data generator generates client verification data F (S) through an operation converting the client key data S stored in the client key data memory using a one-way function. The server has a server authentication data storage, a sever key data memory, a server inverse operator, a server verification data generator, a server key data checker, and a server authentication data checker. The server authentication data storage stores server authentication data M' corresponding to each of the client authentication data M assigned to each of the clients. The sever key data memory stores server key data S' corresponding to each of the client key data S assigned to each of the clients. The server inverse operator generates the server authentication data M' by multiplying the client encrypted data M×S by an inverse number $S'^{-1}$ of the server key data S' stored in the server key data memory. The server verification data generator generates server verification data F (S)' through an operation converting the server key data S' stored in the server key data memory using a one-way function identical to that used by the client verification data generator. The server key data checker compares the server verification data F (S)' generated by the server verification data generator to the client verification data F (S) received from the client, and verifies whether the client key data S matches the server key data S'. The server authentication data checker verifies whether the client authentication data M calculated by the server inverse operator matches the server authentication data M' stored in the server authentication data storage in case that the client key data S matches the server key data S' in the server key data checker.

According to the first aspect of the present invention, even when an intermediary, who intervenes in communication between the authenticated apparatus and the authenticating apparatus, intercepts scrambled data and the verification data transmitted from the authenticated apparatus to the authenticating apparatus, the intermediary is not able to calculate the authentication data or key data using the verification data. The reason for this is because the verification data is generated by processing the scrambled data through an operation that makes back-calculation difficult for a third party, the scrambled data having been generated from the key data and authentication data. In addition, the authentication data cannot be calculated using the scrambled data without the key data. The key data cannot be calculated using the scrambled data without the authentication data. Thereby, high secrecy can be ensured. Moreover, since no further processing is required in the authenticated apparatus and authenticating apparatus besides a multiplication operation and an inverse operation thereof, operation loads and hence costs are reduced.

According to a second aspect of the present invention provided to address the above-described problems, an authenticated apparatus generates scrambled data from key data and authentication data, the scrambled data including product data and the like generated by multiplying the authentication data indicative of one of the authenticated apparatus's and a user's authenticity by the key data. One of another key data, which configures the product data, and authentication data is obtained through back-calculation of the product data by using one of the authentication data and key data. In addition, the authenticated apparatus generates verification data through an operation of any one of the authentication data, key data, and scrambled data, the operation at least making back-calculation difficult for a third party. The verification data and scrambled data are transmitted to an authenticating apparatus. The authenticating apparatus then verifies authenticity of the authenticated apparatus based on the verification data and scrambled data received from the authenticated apparatus, and one of each authenticated apparatus's authentication data and each user's authentication data stored in the authenticating apparatus. The key data is shared between the authenticated apparatus and authenticating apparatus.

According to the second aspect of the present invention, even when an intermediary, who intervenes in communication between the authenticated apparatus and the authenticating apparatus, unjustly intercepts the scrambled data and verification data transmitted from the authenticated apparatus to the authenticating apparatus, the intermediary is not able to calculate the authentication data or key data using the verification data. The reason for this is because the verification data is generated by processing the scrambled data through an operation that makes back-calculation difficult for a third party, the scrambled data having been generated from the key data and authentication data. In addition, the authentication data cannot be calculated using the scrambled data without the key data. The key data cannot be calculated using the scrambled data without the authentication data. Thereby, high secrecy can be ensured. Moreover, since no further processing is required in the authenticated apparatus and authenticating apparatus besides a simple operation such as multiplication, operation loads and hence costs are reduced.

Since the authenticating apparatus can calculate the authentication data solely using the scrambled data, such as product data, the scrambled data alone may be transmitted to the authenticating apparatus. However, in this case, an intermediary might succeed in authentication when data randomly created by the intermediary happens to be matching data. On the other hand, the transmission of the verification data simultaneously with the scrambled data in the present invention allows almost no chance that the intermediary succeeds in finding data matching the verification data in addition to finding data matching the authentication data based on the scrambled data. Thereby, unjust authentication is certainly prevented.

Herein, the authentication data is indicative of the authenticated apparatus's authenticity. Specifically, the authentication data refers to a password assigned to the authenticated apparatus or a user who operates the authenticated apparatus, biometrics information relating to a user who operates the authenticated apparatus, and the like.

In this case, the authenticated apparatus and authenticating apparatus are provided with the key data in advance or using a different method other than that used at the time of authentication. Even when the verification data prevents an intermediary from back-calculating original data, an off-line attack is still possible. The intermediary might randomly enter numbers in the place of the original data to see if it leads to a matching calculation result. Therefore, it is preferable that the value of the original data be sufficiently large. The same applies hereinafter.

According to a third aspect of the present invention provided to address the above-described problems, an authenticated apparatus generates scrambled data from key data and authentication data, the scrambled data including product data and the like generated by multiplying the authentication data indicative of one of the authenticated apparatus's and a user's authenticity by the key data. The key data is obtained through back-calculation of the scrambled data by using the authentication data. In addition, the authenticated apparatus generates verification data through an operation of any one of the key data and scrambled data, the operation at least making back-calculation difficult for a third party. The verification data and scrambled data are transmitted to an authenticating apparatus. The authenticating apparatus then verifies authenticity of the authenticated apparatus based on the verification data and scrambled data received from the authenticated apparatus, and one of each authenticated apparatus's authentication data and each user's authentication data stored in the authenticating apparatus. Any one of the authenticated apparatus and authenticating apparatus generates the key data using random numbers.

According to the third aspect of the present invention, even when an intermediary, who intervenes in communication between the authenticated apparatus and the authenticating apparatus, unjustly intercepts the scrambled data and verification data transmitted from the authenticated apparatus to the authenticating apparatus, the intermediary is not able to calculate the authentication data or key data using the verification data. In addition, the authentication data cannot be calculated using the scrambled data without the key data. The key data cannot be calculated using the scrambled data without the authentication data. Thereby, high secrecy can be ensured. Moreover, since no further processing is required in the authenticated apparatus and authenticating apparatus besides a simple operation such as multiplication, operation loads and hence costs are reduced. Further, since the key data is generated using random numbers, secrecy can be further enhanced.

Since the authenticating apparatus can calculate the authentication data solely using the scrambled data, such as product data, the scrambled data alone may be transmitted to the authenticating apparatus. However, in this case, an intermediary might succeed in authentication when data randomly created by the intermediary happens to be matching data. On the other hand, the transmission of the verification data simultaneously with the scrambled data in the present invention allows almost no chance that the intermediary succeeds in finding data matching the verification data in addition to finding data matching the authentication data based on the scrambled data. Thereby, unjust authentication is certainly prevented.

Herein, the authentication data is indicative of the authenticated apparatus's authenticity. The authentication data refers to a password assigned to the authenticated apparatus or a user who operates the authenticated apparatus, biometrics information relating to a user who operates the authenticated apparatus, and the like.

According to a fourth aspect of the present invention provided to address the above-described problems, the verification data in the second aspect of the present invention is generated through an operation which converts one of the key data and authentication data using a one-way function.

According to the fourth aspect of the present invention, since it is difficult to calculate an inverse function, an intermediary, who intervenes in communication between the authenticated apparatus and the authenticating apparatus, is not able to calculate the authentication data or key data using the verification data. Thereby, secrecy can be ensured.

The one-way function used herein is a function making difficult to calculate the inverse function, hence the original data. Typical examples of such functions include a hash function. Even a power function, in particular a square function, is practically sufficient for one-wayness when provided with a large volume of data (number of digits), and reduces the operation loads. Therefore, such functions are also applicable to simple-structured devices merely having a low-speed computation function. The same applies hereinafter.

According to a fifth aspect of the present invention provided to address the above-described problems, the verification data in the second aspect of the present invention is generated through an operation which encrypts one of the key data and authentication data using a public key of the authenticating apparatus.

The public key or a private key of the authenticating apparatus is not limited to those internally provided in the authenticating apparatus. Examples include an externally provided smart card and the like that are read out by the authenticating apparatus.

According to the fifth aspect of the present invention, an intermediary, who intervenes in communication between the authenticated apparatus and the authenticating apparatus, is not able to calculate the authentication data or key data using the verification data without the private key of the authenticating apparatus. Thereby, secrecy can be ensured.

Various cryptographic methods are applicable in this case: RSA, DH, Elliptic Curve cryptography, and the like. The same applies hereinafter.

When the key data or authentication data is provided with a very large data value, hybrid cryptography is preferable in which a common key is generated using random numbers, the key data or authentication data is encrypted using the common key, and the common key is encrypted using the public key.

According to a sixth aspect of the present invention provided to address the above-described problems, both the authenticated apparatus and authenticating apparatus in the second aspect of the present invention convert one of the authentication data and key data using one-way functions that are identical between the apparatuses. The apparatuses update one of the authentication data and key data based on a conversion result.

According to the sixth aspect of the present invention, even when a third party has stolen the authentication data retained by the authenticated apparatus or authenticating apparatus, the authentication data previously retained by the authenticated apparatus or authenticating apparatus is not available to the third party. Thereby, a forward secure scheme that prevents the tracing of authentication information (an authentication parties, authentication date and time, and the like) back to previous communication is enabled. In case of card authentication and the like where the authenticated apparatus is a card, a special measure is not required to ensure safety when the card is discarded. In addition, since no further processing is required in the apparatuses besides the conversion, costs can be reduced.

In this case, the update processing is performed simultaneously in the authenticated apparatus and authenticating apparatus. For example, the authentication data is updated in the authenticated apparatus at each authentication. Simultaneously, the authentication data or key data relating to the authenticated apparatus that was just authenticated is updated in the authenticating apparatus.

The conversion of the authentication data or key data using a one-way function may be performed on the entire or a part of authentication data or key data.

According to a seventh aspect of the present invention provided to address the above-described problems, the authenticated apparatus in the second aspect of the present invention encrypts one of the authentication data and key data using the public key of the authenticating apparatus so as to generate the scrambled data, and transmits the scrambled data to the authenticating apparatus; and the authenticating apparatus in the second aspects of the present invention performs an operation on the scrambled data received from the authenticated apparatus so as to decrypt the scrambled data using its own private key, the operation being inverse from that performed by the authenticated apparatus.

According to the seventh aspect of the present invention, even when an intermediary has stolen the authentication data retained by the authenticated apparatus or authenticating apparatus, the content of the authentication data or key data that is to be transmitted is not available to the intermediary without the private key, since the authentication data or key data has been encrypted. Thereby, a backward secure scheme that prevents the searching of the authentication information in the future is enabled. In case of card authentication and the like where the authenticated apparatus is a card, even when a third party has surreptitiously intercepted card information, the third party is at least prevented from monitoring a cardholder's activities. In addition, the forward secure scheme that prevents the tracing of authentication information back to previous communication is enabled.

The encryption of the authentication data or key data may be performed on the entire or a part of authentication data or key data. The public key or private key of the authenticating apparatus is not limited to those internally provided in the authenticating apparatus. Examples include an externally provided smart card and the like that are read out by the authenticating apparatus.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The embodiments of the present invention are explained in the following with reference to the above-described drawings.

Figure 1:
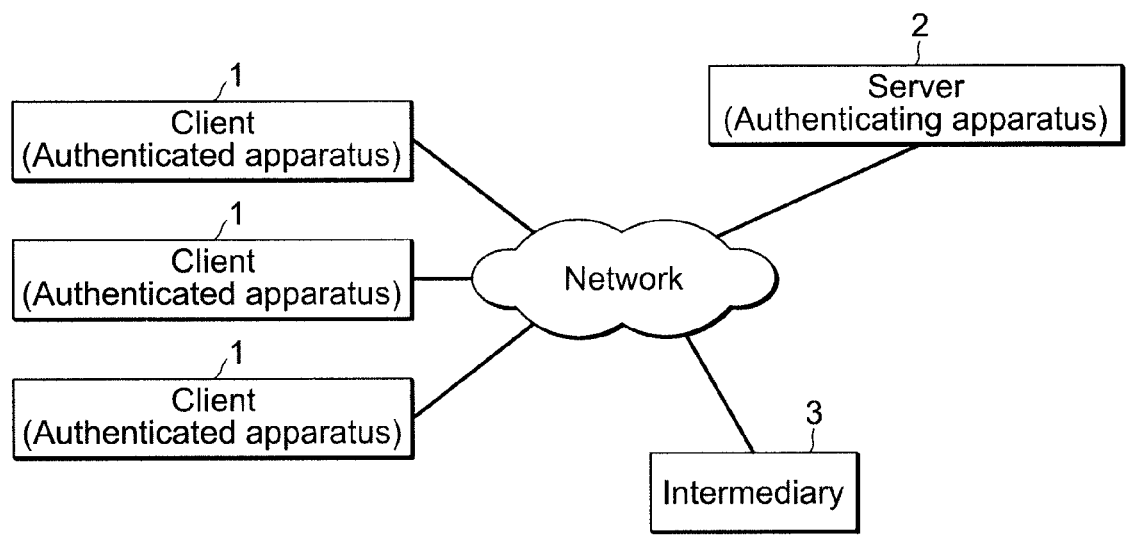
FIG. 1 is a system configuration diagram of a secret authentication system according to the present invention.

FIG. 1 is a system configuration diagram of a secret authentication system according to the present invention. Herein, client (authenticated apparatus) 1 and server (authenticating apparatus) 2 are connected via a network; and client authentication data (a password and the like), which is used by server 2 to authenticate client 1, is transmitted from client 1 to server 2. Such an authentication system employs the below-described secret authentication system in order to prevent intermediary 3, which intervenes in communication between client 1 and server 2, from stealing the authentication data and being unjustly authenticated in server 2 as authentic client 1 through spoofing.

(Example of Key-Sharing-Type Verification Data Generated Using One-Way Function)

Figure 2:
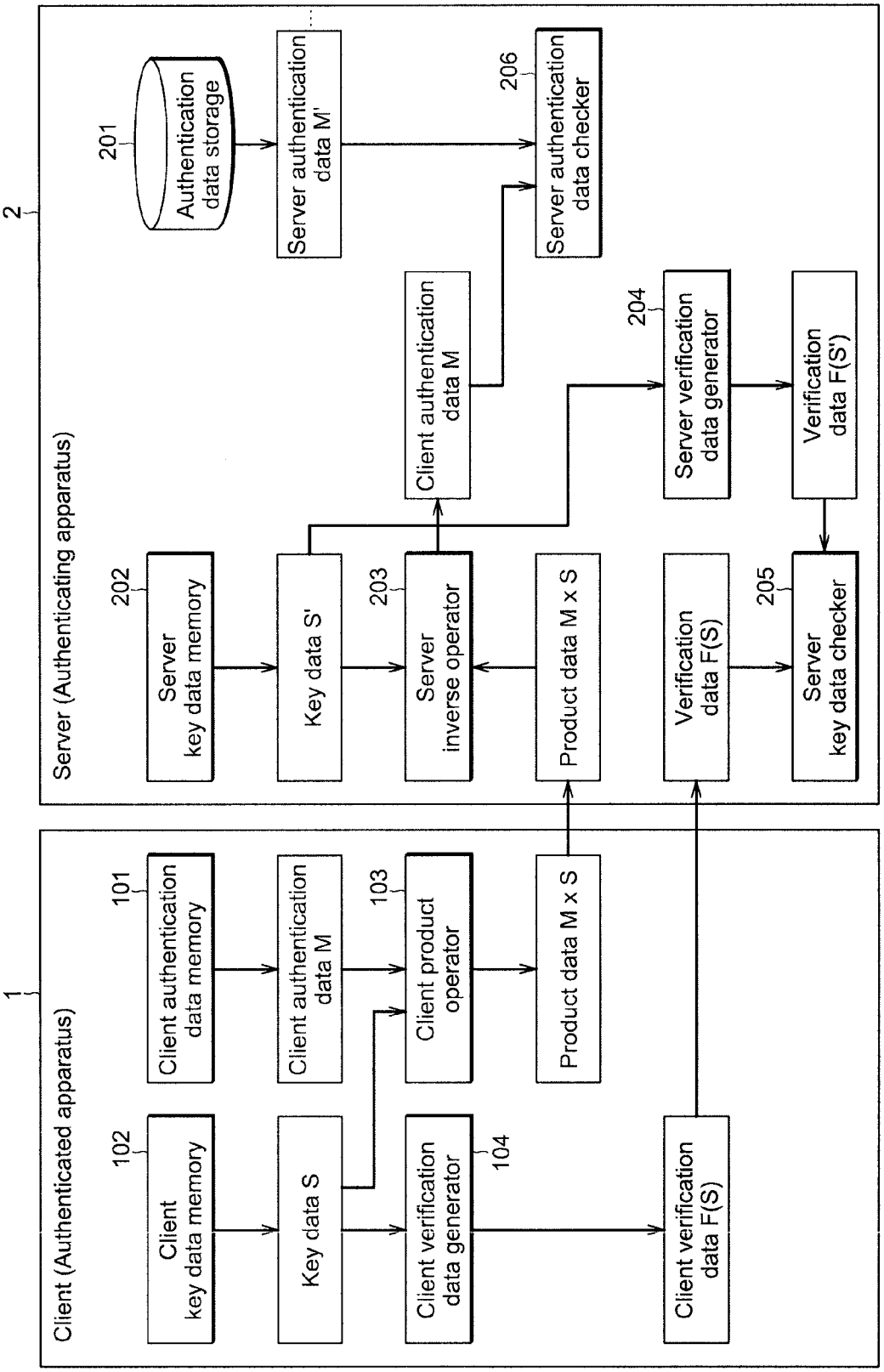
FIG. 2 is a block diagram of a first embodiment of a client and server configuring the secret authentication system according to the present invention.

FIG. 2 is a block diagram of a first embodiment of the client and server configuring the secret authentication system according to the present invention. Client apparatus 1 has client authentication data memory 101, client key data memory 102, client product operator 103, and client verification data generator 104. Client authentication data memory 101 confidentially stores client authentication data M that is indicative of authenticity of client 1. Client key data memory 102 confidentially stores key data S. Client product operator 103 generates encrypted data M×S (scrambled data or encrypted data) by multiplying the key data S in client key data memory 102 by the client authentication data M. Client verification data generator 104 generates client verification data F (S) through an operation that converts the key data S using a one-way function. Upon requesting authentication to server 2, client 1 transmits the client verification data F (S) generated by client verification data generator 104 and the client encrypted data M×S generated by client product operator 103 to server 2.

The one-way function used in client verification data generator 104 may be a hash function that is a typical example of the one-way function. However, a square function is preferable, as the square function provides practically sufficient one-wayness and reduces an operation load. Therefore, the square function is also applicable to simple-structured devices merely having a low-speed computation function (an RFID tag and the like).

Server apparatus 2 has server authentication data storage 201, server key data memory 202, server inverse operator 203, server verification data generator 204, server key data checker 205, and server authentication data checker 206. Server authentication data storage 201 stores server authentication data M' for each of plurality of clients 1. Server key data memory 202 confidentially stores the key data S' that is identical to that of client 1. Server inverse operator 203 calculates the client authentication data M by multiplying the client encrypted data M×S (scrambled data) received from client 1 by an inverse number of the server key data S' in server key data memory 202. Server verification data generator 204 generates server verification data F (S)' through an operation that converts the server key data S' in server key data memory 202 using a one-way function that is identical to that used in client verification data generator 104 of client 1. Server key data checker 205 determines genuineness of the client key data S by comparing the server verification data F (S)' generated by server verification data generator 204 to the client verification data F (S) received from client 1. Server authentication data checker 206 determines authenticity of client 1 by comparing the client authentication data M obtained by server inverse operator 203 to the server authentication data M' stored in server authentication data storage 201.

In server authentication data checker 206, when the client key data S is determined to be genuine in server key data checker 205, the server authentication data M' is sequentially read out of server authentication data storage 201 and then compared to the client authentication data M obtained by server inverse operator 203. When both of the authentication data match, authentication is successful. When they do not match, authentication fails.

The client key data S and server key data S' are shared by client 1 and server 2 in advance or later using a different method than that used at the time of authentication. Server apparatus 2 may retain the server key data S' in an inverse number $S^{-1}$.

In the configuration above, even when intermediary 3 shown in FIG. 1 has intercepted the client encrypted data M×S (scrambled data) and client verification data F (S) that are transmitted from client 1 to server 2 shown in FIGS. 1 and 2, intermediary 3 shown in FIG. 1 is not able to calculate the client key data S from the client verification data F (S) shown in FIG. 2. In addition, without the client key data S, the client authentication data M cannot be calculated from the client encrypted data M×S (scrambled data). Even when the client encrypted data M×S is used alone without the client verification data F (S) as shown in FIG. 2, since server 2 has the server key data S' that is identical to that of client 1, server 2 can calculate the client authentication data M solely using client encrypted data M×S and thereby authenticate client 1. In this case, intermediary 3 shown in FIG. 1, which is normally assumed not to know the client authentication data M and client key data S, might succeed in authentication when data randomly created by intermediary 3 shown in FIG. 1 happens to match server encrypted data M'×S' that is generated by multiplying the server authentication data M' by the server key data S' in server 2 shown in FIG. 2. However, even though the data randomly created by intermediary 3 shown in FIG. 1 matches the server encrypted data M'×S', it is not easy for intermediary 3 shown in FIG. 1 to individually identify the client authentication data M or client key data S shown in FIG. 2, since there are a large number of combinations of the authentication data and key data that cryptographically form M×S. In addition, as shown in FIG. 2, when the client verification data F (S), which is calculated from the client key data S through an operation using a one-way function, is also used for authentication request, there is almost no chance that intermediary 3 also succeeds in finding data matching the client verification data F (S). Therefore, in the configuration shown in FIG. 2, it is difficult for intermediary 3 shown in FIG. 1 to individually identify the authentication data M or key data S used by client 1 or server 2 in FIG. 2. Thereby, high secrecy can be ensured.

(Another Example of Key-Sharing-Type Verification Data Generated Using One-Way Function)

Figure 3:
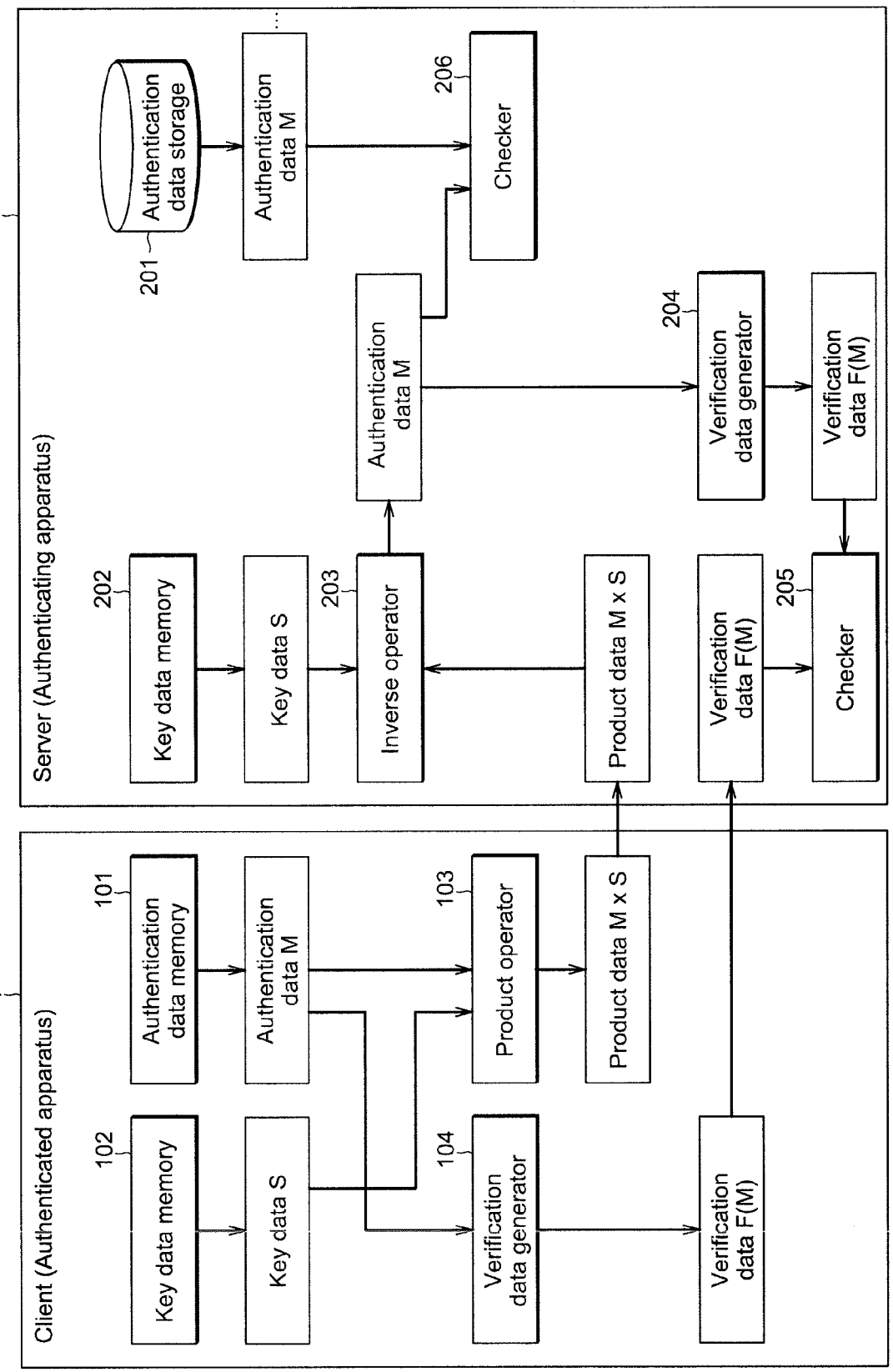
FIG. 3 is a block diagram of a second embodiment of the client and server configuring the secret authentication system according to the present invention.

FIG. 3 is a block diagram of a second embodiment of the client and server configuring the secret authentication system according to the present invention. In the embodiment shown in FIG. 2, verification data generator 104 of client 1 and verification data generator 204 of server 2 generate verification data F (S) through an operation that converts the key data S using a one-way function. In the embodiment shown in FIG. 3, verification data generators 104 and 204 generate the verification data F (M) through an operation that converts the authentication data M using a one-way function. Other configurations are the same as those of the embodiment shown in FIG. 2. In this configuration, even when intermediary 3 shown in FIG. 1 has intercepted the product data M×S (scrambled data) and verification data F (M) that are transmitted from client 1 to server 2 shown in FIGS. 1 and 3, intermediary 3 shown in FIG. 1 is not able to calculate the authentication data M from the verification data F (M) shown in FIG. 3. In addition, without the authentication data M, the key data S cannot be calculated from the product data M×S (scrambled data). Even when the product data M×S is used alone without the verification data F (M) as shown in FIG. 3, since server 2 has the key data S that is identical to that of client 1, server 2 can calculate the authentication data M solely using the product data M×S and thereby authenticate client 1. In this case, intermediary 3 shown in FIG. 1, which is normally assumed not to know the authentication data M and key data S, might succeed in authentication when data randomly created by intermediary 3 shown in FIG. 1 happens to match multiplication M×S that is generated by multiplying the authentication data M by the key data S in server 2 shown in FIG. 3. However, even though the data randomly created by intermediary 3 shown in FIG. 1 matches M×S, it is not easy for intermediary 3 shown in FIG. 1 to individually identify the authentication data M or key data S shown in FIG. 3, since there are a large number of combinations of the authentication data and key data that form M×S by multiplication. In addition, as shown in FIG. 3, when the client verification data F (M), which is calculated from the authentication data M through an operation using a one-way function, is also used for authentication request, there is almost no chance that intermediary 3 also succeeds in finding data matching the verification data F (M). Therefore, in the configuration shown in FIG. 3, it is difficult for intermediary 3 shown in FIG. 1 to individually identify the authentication data M or key data S used by client 1 or server 2 in FIG. 3. Thereby, high secrecy can be ensured.

(Example of Key-Sharing-Type Verification Data Generated Using Encryption)

Figure 4:
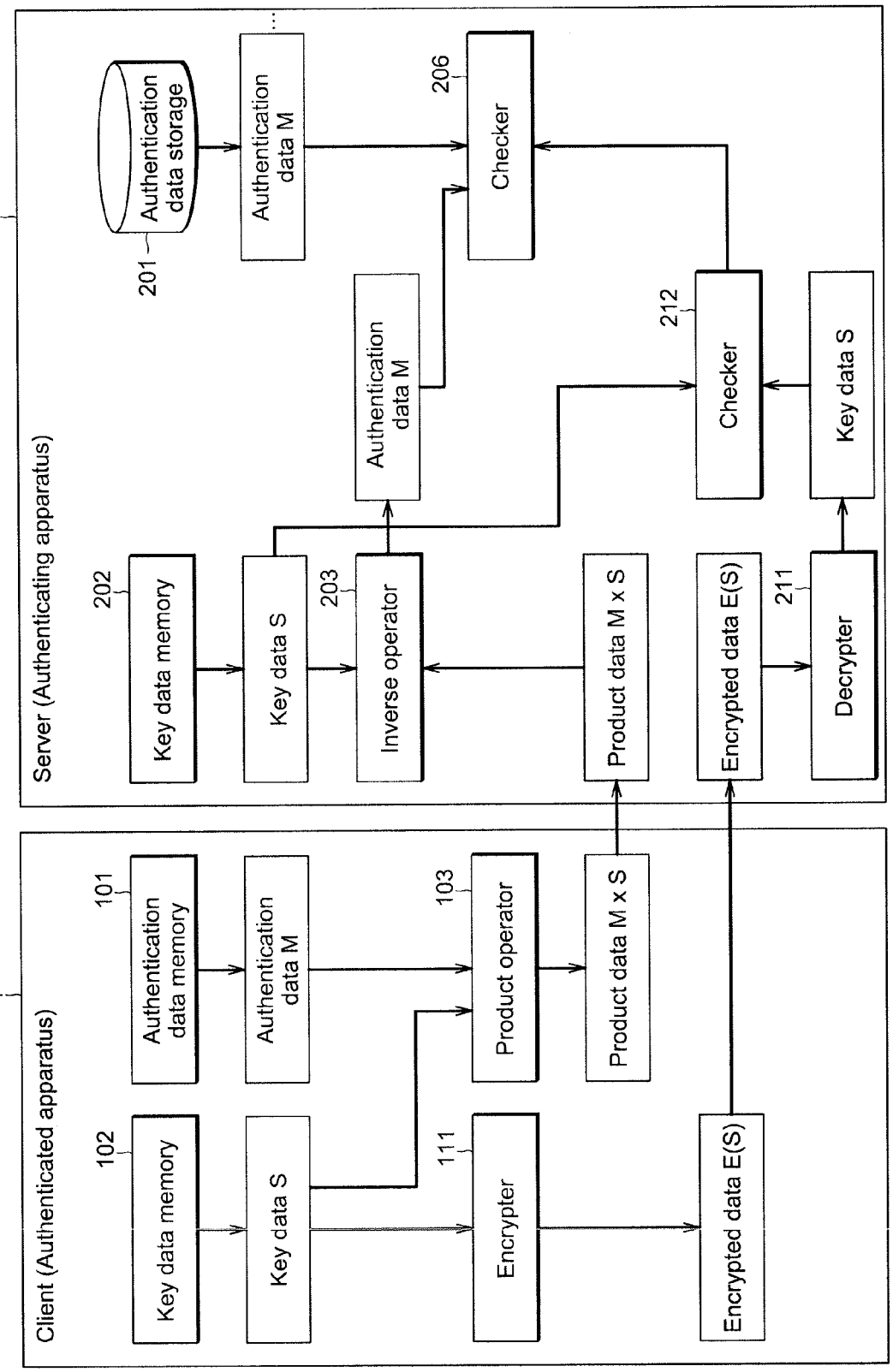
FIG. 4 is a block diagram of a third embodiment of the client and server configuring the secret authentication system according to the present invention.

FIG. 4 is a block diagram of a third embodiment of the client and server configuring the secret authentication apparatus according to the present invention. In the embodiment in FIG. 2, verification data generator 104 of client 1 and verification data generator 204 of server 2 generate the verification data F (S) through an operation that converts the key data S using a one-way function. Checker 205 of server 2 compares these verification data so as to determine genuineness of the key data S. In the embodiment shown in FIG. 4, client 1 has encrypter 111 that encrypts the key data S using a public key (not shown), which was obtained from server 2 in advance. The encrypted key data E (S) generated by encrypter 111 and the product data M×S are transmitted to server 2. Server apparatus 2 has decrypter 211 and checker 212. Decrypter 211 decrypts the encrypted key data E (S) received from client 1 using its own private key (not shown). Checker 212 determines genuineness of the key data S by comparing the key data S obtained by decrypter 211 to the key data S stored in key data memory 202. Other configurations are the same as those of the embodiment shown in FIG. 2.

In this configuration, even when an intermediary shown in FIG. 1 has intercepted the product data M×S (scrambled data) and encrypted key data E (S) that are transmitted from client 1 to server 2 shown in FIGS. 1 and 4, intermediary 3 shown in FIG. 1 is not able to calculate the key data S from the encrypted key data E (S) without the private key of server 2 shown in FIG. 4. In addition, without the key data S, the authentication data M cannot be calculated from the product data M×S (scrambled data). Even when the product data M×S is used alone without the encrypted data E (S) as shown in FIG. 4, since server 2 has the key data S that is identical to that of client 1, server 2 can calculate the authentication data M solely using the product data M×S and thereby authenticate client 1. In this case, intermediary 3 shown in FIG. 1, which is normally assumed not to know the authentication data M and key data S, might succeed in authentication when data randomly created by intermediary 3 shown in FIG. 1 happens to match the multiplication M×S that is generated by multiplying the authentication data M by the key data S in server 2 shown in FIG. 4. However, even though the data randomly created by intermediary 3 shown in FIG. 1 matches M×S, it is not easy for intermediary 3 shown in FIG. 1 to individually identify the authentication data M or key data S shown in FIG. 4, since there are a large number of combinations of the authentication data and key data that form M×S by multiplication. In addition, as shown in FIG. 4, when the encrypted data E (S), which is generated by encrypting the key data S using the public key (not shown) that was obtained from server 2 in advance, is also used for authentication request, there is almost no chance that intermediary 3 also succeeds in finding data matching the encrypted data E (S). Moreover, when the private key (not shown) used by server 2 and the public key (not shown) that is generated from the private key and that is given to client 1 are changed every time client 1 requests authentication, the encrypted data E (S) is also changed therewith. Even when intermediary 3 shown in FIG. 1 intercepts the product data M×S and encrypted data E (S) shown in FIG. 4, the intercepted encrypted data E (S) is not useable, since the encrypted data is changed by the time of the next authentication request, and the changed encrypted data no longer matches the intercepted encrypted data E (S). Therefore, it is difficult for intermediary 3 to be authenticated through spoofing using the intercepted product data M×S (scrambled data) and encrypted data E (S). Accordingly, in the configuration shown in FIG. 4, it is difficult for intermediary 3 shown in FIG. 1 to individually identify the authentication data M or key data S that are used by client 1 and server 2 shown in FIG. 4. In addition, it is difficult for intermediary 3 to be authenticated through spoofing using the intercepted product data M×S (scrambled data) and encrypted data E (S). Thereby, high secrecy can be ensured.

(Another Example of Key-Sharing-Type Verification Data Generated Using Encryption)

Figure 5:
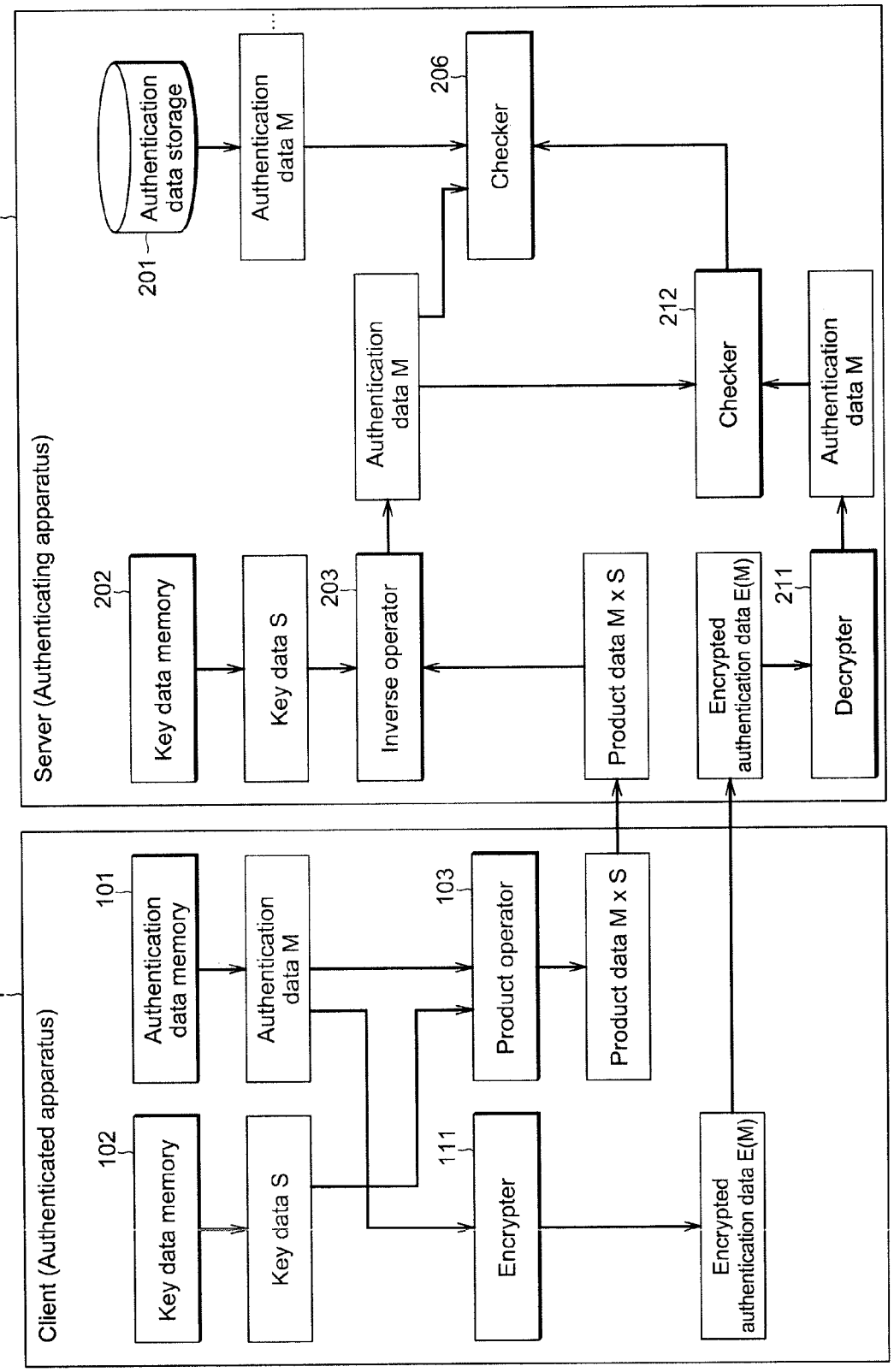
FIG. 5 is a block diagram of a fourth embodiment of the client and server configuring the secret authentication system according to the present invention.

FIG. 5 is a block diagram of a fourth embodiment of the client and server shown in FIG. 1. In the embodiment shown in FIG. 4, encrypter 111 of client 1 generates the encrypted data E (S) by encrypting the key data S using the public key (not shown) that was obtained from server 2 in advance. The encrypted data E (S) and product data M×S are transmitted to server 2. Decrypter 211 of server 2 then decrypts the encrypted data E (S) using its own private key (not shown). The key data S obtained by decrypter 211 is compared to the key data S calculated by inverse operator 203 so as to determine genuineness of the key data S. In the embodiment shown in FIG. 5, encrypter 111 of client 1 encrypts the authentication data M using the public key (not shown) that was obtained from server 2 in advance. The obtained encrypted authentication data E (M) and product data M×S are transmitted to server 2. Decrypter 211 of server 2 then decrypts the encrypted authentication data E (M) using its own private key (not shown). Checker 212 determines genuineness of the authentication data M by comparing the authentication data M obtained by decrypter 211 to the authentication data M calculated by inverse operator 203. Other configurations are the same as those of the embodiment shown in FIG. 4. In this configuration, even when intermediary 3 shown in FIG. 1 intercepts the product data M×S (scrambled data) and encrypted authentication data E (M) transmitted from client 1 shown in FIGS. 1 and 5 to server 2, intermediary 3 shown in FIG. 1 cannot calculate the authentication data M from the encrypted authentication data E (M) without the private key of server 2 shown in FIG. 5. In addition, without the authentication data M, the key data S cannot be calculated from the product data M×S. Even when the product data M×S is used alone without the encrypted data E (M) as shown in FIG. 5, since server 2 has the key data S that is identical to that of client 1, server 2 can calculate the authentication data M solely using the product data M×S and thereby authenticate client 1. In this case, intermediary 3 shown in FIG. 1, which is normally assumed not to know the client authentication data M and client key data S, might succeed in authentication when data randomly created by intermediary 3 shown in FIG. 1 happens to match the product data M×S that is generated by multiplying the authentication data M by the key data S in server 2 shown in FIG. 5. However, even though the data randomly created by intermediary 3 shown in FIG. 1 matches M×S, it is not easy for intermediary 3 shown in FIG. 1 to individually identify the authentication data M or key data S shown in FIG. 5, since there are a large number of combinations of the authentication data and key data that form M×S by multiplication. In addition, as shown in FIG. 5, the encrypted authentication data E (M), which is generated by encrypting the authentication data M using the public key (not shown) that is obtained from server 2 in advance, is also used for authentication request, there is almost no chance that intermediary 3 also succeeds in finding data matching the encrypted authentication data E (M). Moreover, when the private key (not shown) used by server 2 and the public key (not shown) that is in pair with the private key and that is given to client 1 are changed every time client 1 requests authentication, the encrypted data E (M) is also changed therewith. Even when intermediary 3 shown in FIG. 1 intercepts the product data M×S and encrypted authentication data E (M), the intercepted encrypted data E (M) is not useable, since the encrypted data is changed by the time of the next authentication request, and the changed encrypted data no longer matches the intercepted encrypted authentication data E (M). Therefore, it is difficult for intermediary 3 to be authenticated through spoofing using the intercepted product data M×S (scrambled data) and encrypted data E (M). Therefore, in the configuration shown in FIG. 5, it is difficult for intermediary 3 in FIG. 1 to individually identify the authentication data M or key data S that are used by client 1 and server 2 shown in FIG. 5. In addition, it is difficult for intermediary 3 to be authenticated through spoofing using the intercepted product data M×S (scrambled data) and encrypted data E (M). Thereby, high secrecy can be ensured.

(Example Enabling Forward Secure Scheme)

Figure 6:
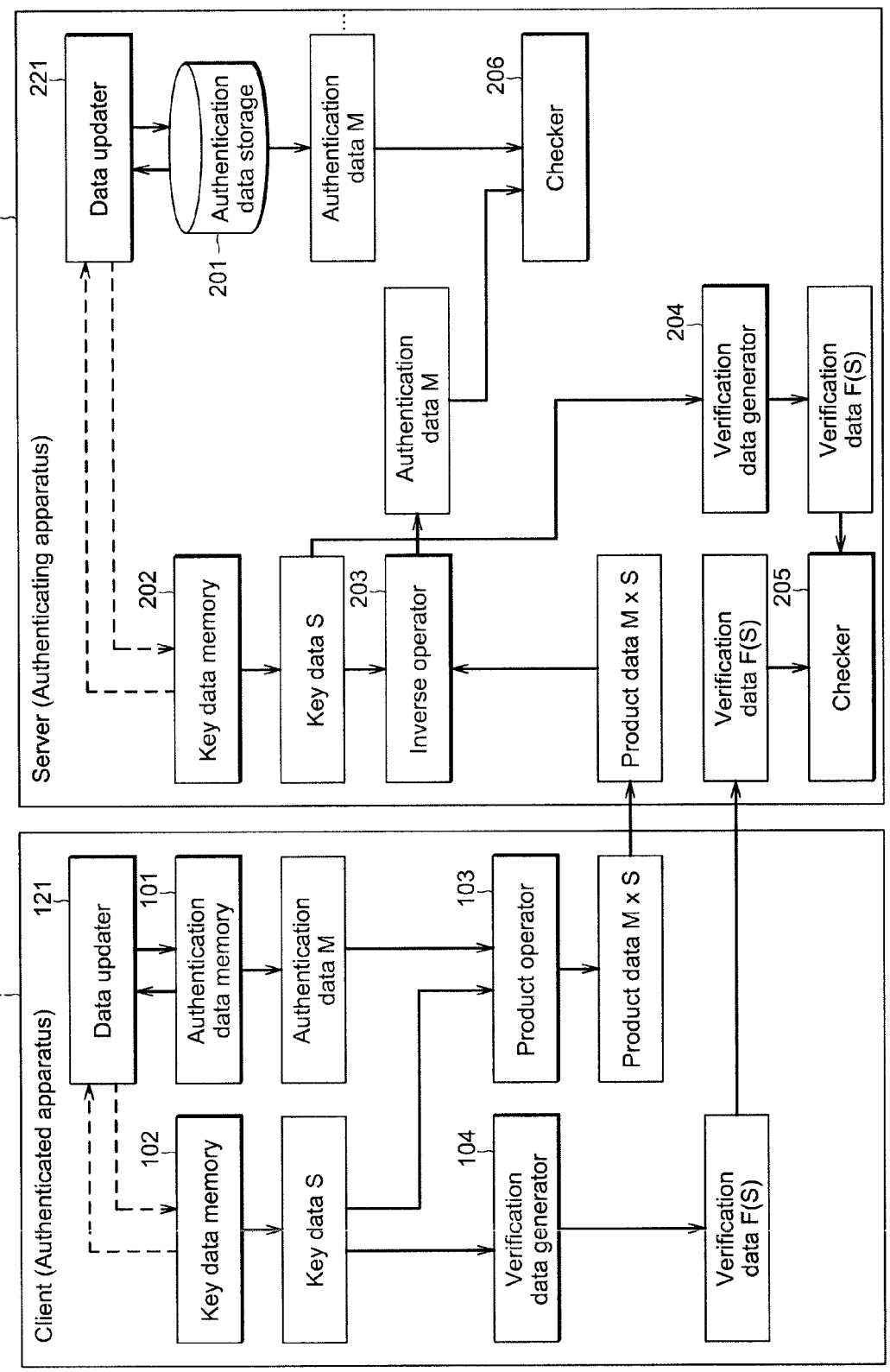
FIG. 6 is a block diagram of a fifth embodiment of the client and server configuring the secret authentication system according to the present invention.

FIG. 6 is a block diagram of a fifth embodiment of the client and server configuring the secret authentication system according to the present invention. Herein, in addition to the configuration shown in FIG. 2, client 1 has data updater 121 that converts the authentication data M that is stored in authentication data memory 101 using a one-way function and updates the authentication data M based on a conversion result. Server apparatus 2 has data updater 221 that converts the authentication data M stored in authentication data storage 201 using a one-way function and updates the authentication data M based on a conversion result. Other configurations are the same as those of the embodiment shown in FIG. 2.

The one-way function used in data updater 121 of client 1 is identical to that used in data updater 221 of server 2. The one-way function may be a hash function that is a typical example of the one-way function. However, a square function is preferable, as the square function provides practically sufficient one-wayness and reduces an operation load. Therefore, the square function is also applicable to simple-structured devices merely having a low-speed computation function (an RFID tag and the like).

The update processing is performed simultaneously in data updater 121 of client 1 and data updater 221 of server 2. For example, the authentication data is updated in data updater 121 of client 1 at each authentication. Simultaneously, the authentication data relating to client 1 is updated in data updater 221 of server 2.

Thereby, even when a third party has stolen the authentication data retained by client 1 or server 2, the authentication data previously retained by client 1 or server 2 is not available to the third party. Thereby, a forward secure scheme that prevents the tracing of authentication information (an authentication parties, authentication date and time, and the like) back to previous communication is enabled. In addition, since the conversion alone is sufficient for the apparatuses to ensure safety, costs can be reduced.

The key data stored in key data memories 102 and 202 may be updated using a one-way function in data updaters 121 and 221.

(Example Enabling Forward and Back Secure Scheme)

Figure 7:
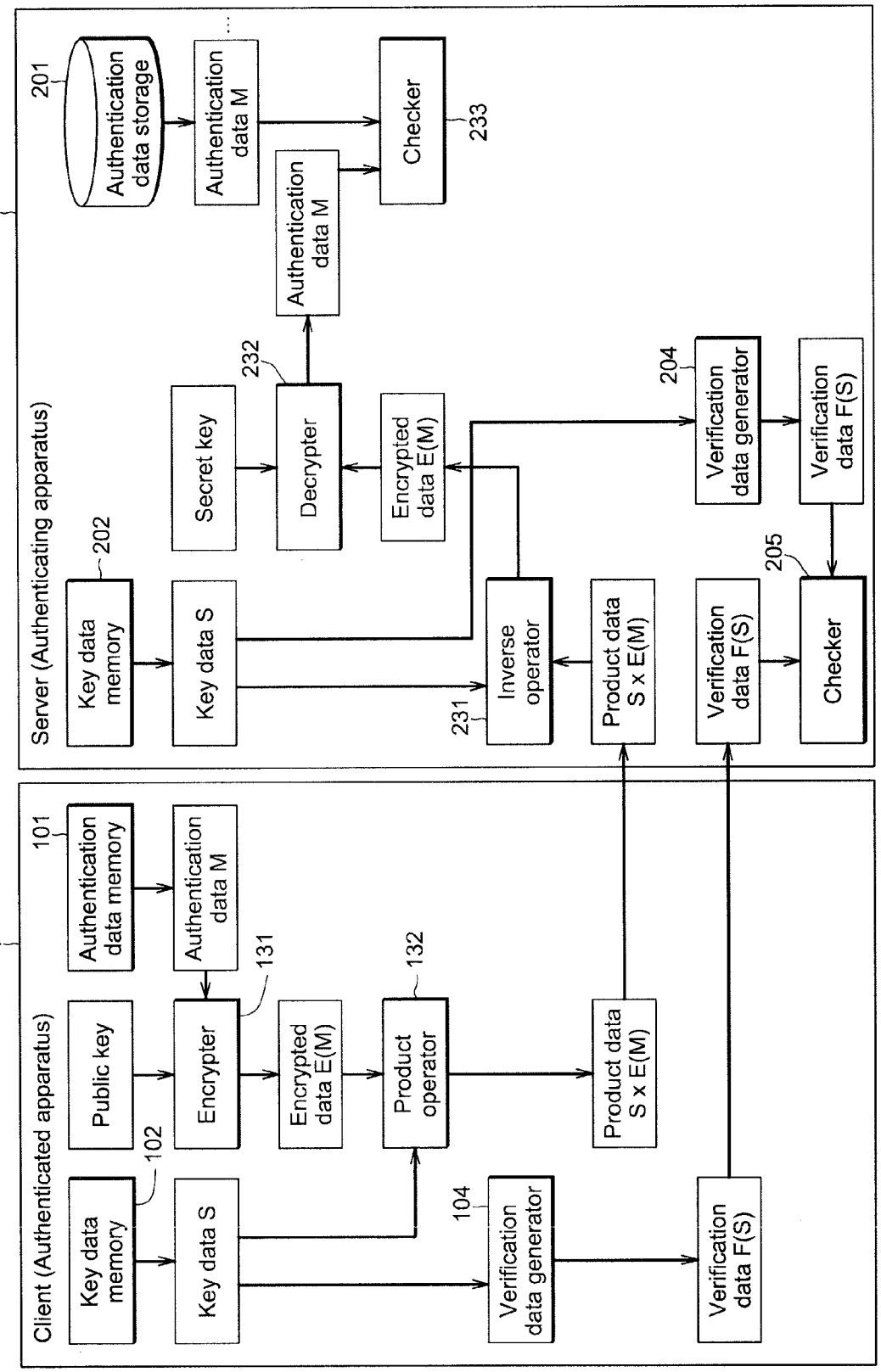
FIG. 7 is a block diagram of a sixth embodiment of the client and server configuring the secret authentication system according to the present invention.

FIG. 7 is a block diagram of a sixth embodiment of the client and server configuring the secret authentication system according to the present invention. Herein, in addition to the configuration shown in FIG. 2, client 1 has encrypter 131 and product operator 132. Encrypter 131 encrypts the authentication data M using the public key of server 2. Product operator 132 generates product data S×E (M) by multiplying the encrypted authentication data E (M) generated by encrypter 131 by the key data S in key data memory 102. The product data S×E (M) generated by product operator 132 and the verification data F (S) are transmitted to server 2.

Server apparatus 2 has inverse operator 231, decrypter 232, and checker 233. Inverse operator 231 calculates the encrypted authentication data E (M) by multiplying the product data S×E (M) received from client 1 by an inverse number of the key data S. Decrypter 232 decrypts the encrypted authentication data E (M) calculated by inverse operator 231 using its own private key. Checker 233 verifies genuineness of client 1 by comparing the authentication data M obtained by decrypter 232 to the authentication data M stored in authentication data storage 201. Other configurations are the same as those of the embodiment shown in FIG. 2.

In this configuration, even when a third party has stolen the authentication data M retained by client 1 or server 2, since the authentication data M has been encrypted, the content of the authentication data that is to be transmitted is not available to the third party unless the third party has both of the key data S and the private key of server 2. Thereby, a backward secure scheme that prevents the searching of the authentication information in the future is enabled. In addition, the forward secure scheme that prevents the tracing of authentication information back to previous communication is enabled.

The product data M×S or verification data F (S) may be encrypted. However, unless the values of the authentication data M and key data S change, the encrypted data always shows the same value. Therefore, although intermediary 3 is not able to identify an authenticator, there is a risk that intermediary 3 finds when authentication is performed by a specific party. In order to avoid such a risk, it is preferable that the authentication data M and key data S be successively updated, as shown in FIG. 6. In a hybrid encryption in which a common key is generated using random numbers, the authentication data M and key data S are encrypted using the common key, and the common key is encrypted using the public key of server 2. Thereby, the hybrid encryption prevents the risk without the successive updating of the authentication data M and key data S.

(Example of Interactive Authentication)

Figure 8:
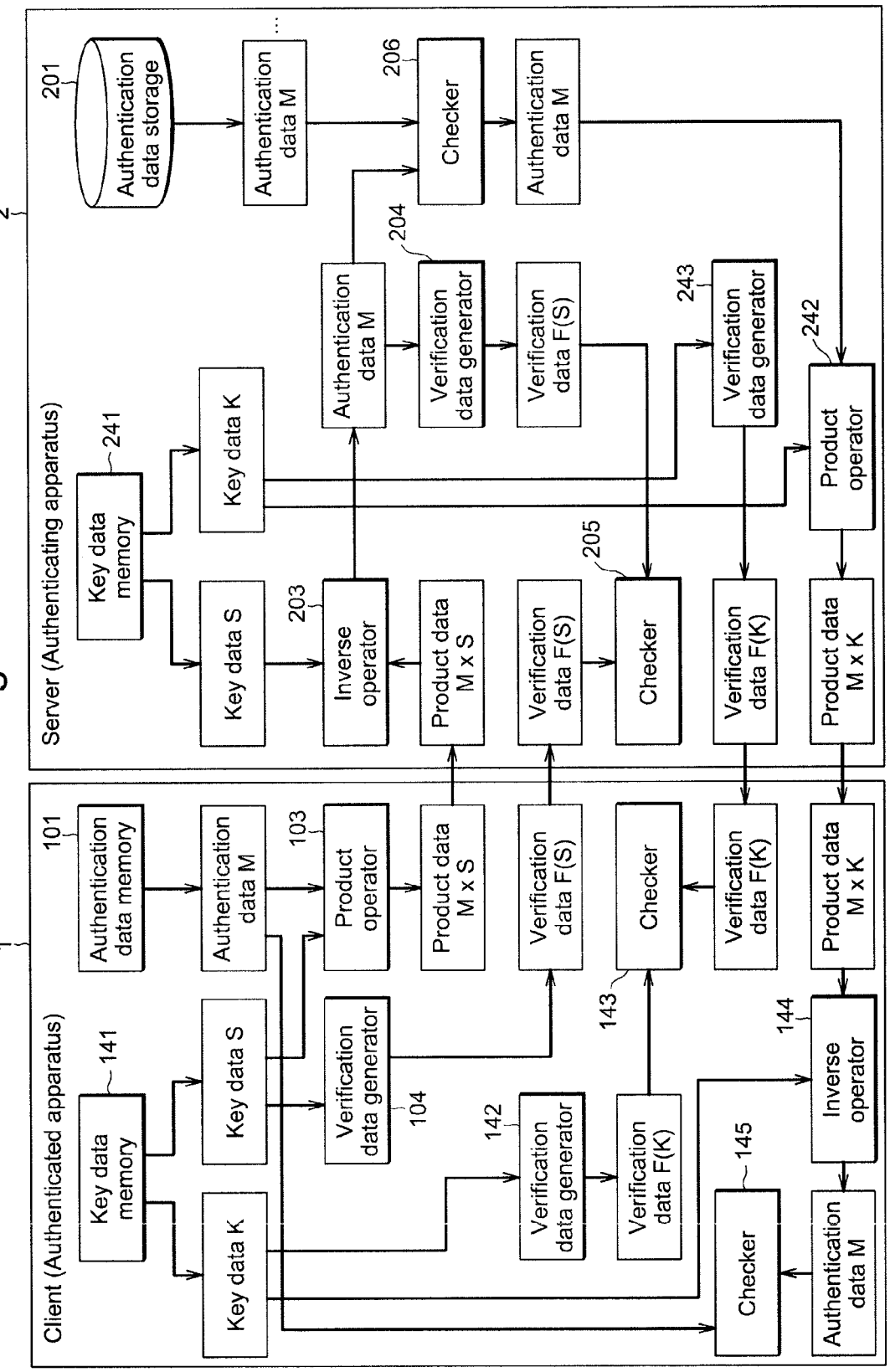
FIG. 8 is a block diagram of a seventh embodiment of the client and server configuring the secret authentication system according to the present invention.

FIG. 8 is a block diagram of a seventh embodiment of the client and server configuring the secret authentication system according to the present invention. Herein, in addition to the configuration shown in FIG. 2, server 2 has key data memory 241, product operator 242, and verification data generator 243. Key data memory 241 confidentially stores the key data S and K that are different from each other. Product operator 242 generates product data M×K by multiplying the authentication data M that has been successfully authenticated in checker 206 by the key data K in key data memory 241. Verification data generator 243 generates verification data F (K) through an operation that converts the key data K in key data memory 241 using a one-way function. The verification data F (K) generated by the verification generator 243 and the product data M×K generated by product operator 242 are transmitted to client 1.

In addition to the configuration shown in FIG. 2, client 1 has key data memory 141, verification data generator 142, checker 143, inverse operator 144, and checker 145. Key data memory 141 confidentially stores the key data S and K that are different from each other. Verification data generator 142 generates the verification data F (K) through an operation that converts the key data K in key data memory 141 using a one-way function. Checker 143 determines genuineness of the key data K by comparing the verification data F (K) generated by verification data generator 142 to the verification data F (K) received from server 2. Inverse operator 144 calculates the authentication data M by multiplying the product data M×K received from server 2 by an inverse number of the key data K in the key data memory 141. Checker 145 determines authenticity of server 2 by comparing the authentication data M calculated by inverse operator 144 to the authentication data M in authentication data memory 101.

This configuration allows client 1 to verify authenticity of server 2, and hence interactive authentication is enabled.

Herein, the key data S used at the time client 1 requests authentication from server 2 and the key data K used at the time server 2 responds to the request from client 1 are different, so that the use of the same communication data at the time of the authentication request and the time of the response is prevented. However, when a one-way function used at the time of the authentication request is different from that used at the time of the response (e.g., a square function is used at the time of the authentication request and a hash function is used at the time of the response), the same key data may be used at the time of the authentication request and the time of the response.

(Example of Random-Number-Key-Type Verification Data Generated Using One-Way Function)

Figure 9:
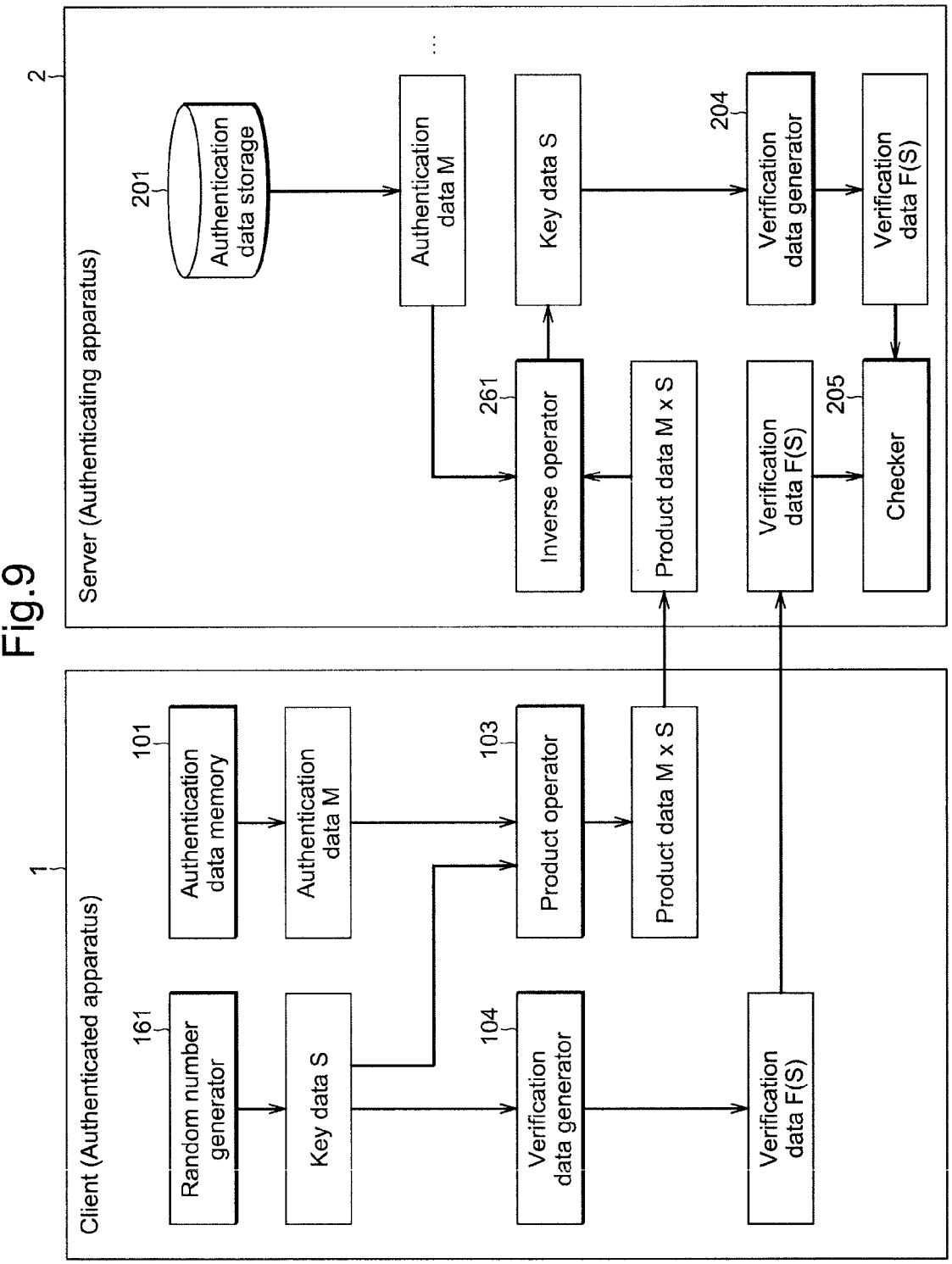
FIG. 9 is a block diagram of an eighth embodiment of the client and server configuring the secret authentication system according to the present invention.

FIG. 9 is a block diagram of an eighth embodiment of the client and server configuring the secret authentication system according to the present invention. Herein, client 1 has random number generator 161 that generates the key data S using random numbers. The product data M×S and verification data F (S) are generated by product operator 103 and verification data generator 104, respectively, using the key data S generated herein.

Server apparatus 2 has inverse operator 261 that calculates the key data S by multiplying the product data M×S received from client 1 by an inverse number of the authentication data M stored in authentication data storage 201. Verification data generator 204 generates the authentication data F (S) using the key data S obtained herein. Checker 205 compares the verification data F (S) generated by verification data generator 204 to the verification data F (S) received from client 1. Other configurations are the same as those of the embodiment shown in FIG. 2.

Inverse operator 261 sequentially reads the authentication data M out of authentication data storage 201. Checker 205 determines whether the authentication is successful. When the verification data F (S) generated by verification data generator 204 matches the verification data F (S) received from client 1, the authentication is successful. When they do not match, the next authentication data M is read out of authentication data storage 201 and undergoes the same processes. When there is no matching data, the authentication fails.

In this configuration, even when intermediary 3 has intercepted the product data M×S and verification data F (S) that are transmitted from client 1 to server 2, intermediary 3 is not able to calculate the key data S from the verification data F (S). Without the key data S, the authentication data M cannot be calculated from the product data M×S. In addition, when the authentication data is updated using a one-way function as shown in FIG. 6, the forward secure scheme is enabled.

ID data used to identify the authentication data M may be transmitted from client 1 to server 2 along with the verification data F (S) and product data M×S. In this method, the authentication data M that corresponds to the ID data received from client 1 is read out of authentication data storage 201, and therefore checker 205 needs to perform the comparison only once. Thereby, the process is simplified.

(Example of Random-Number-Key-Type Verification Data Generated Using Encryption)

Figure 10:
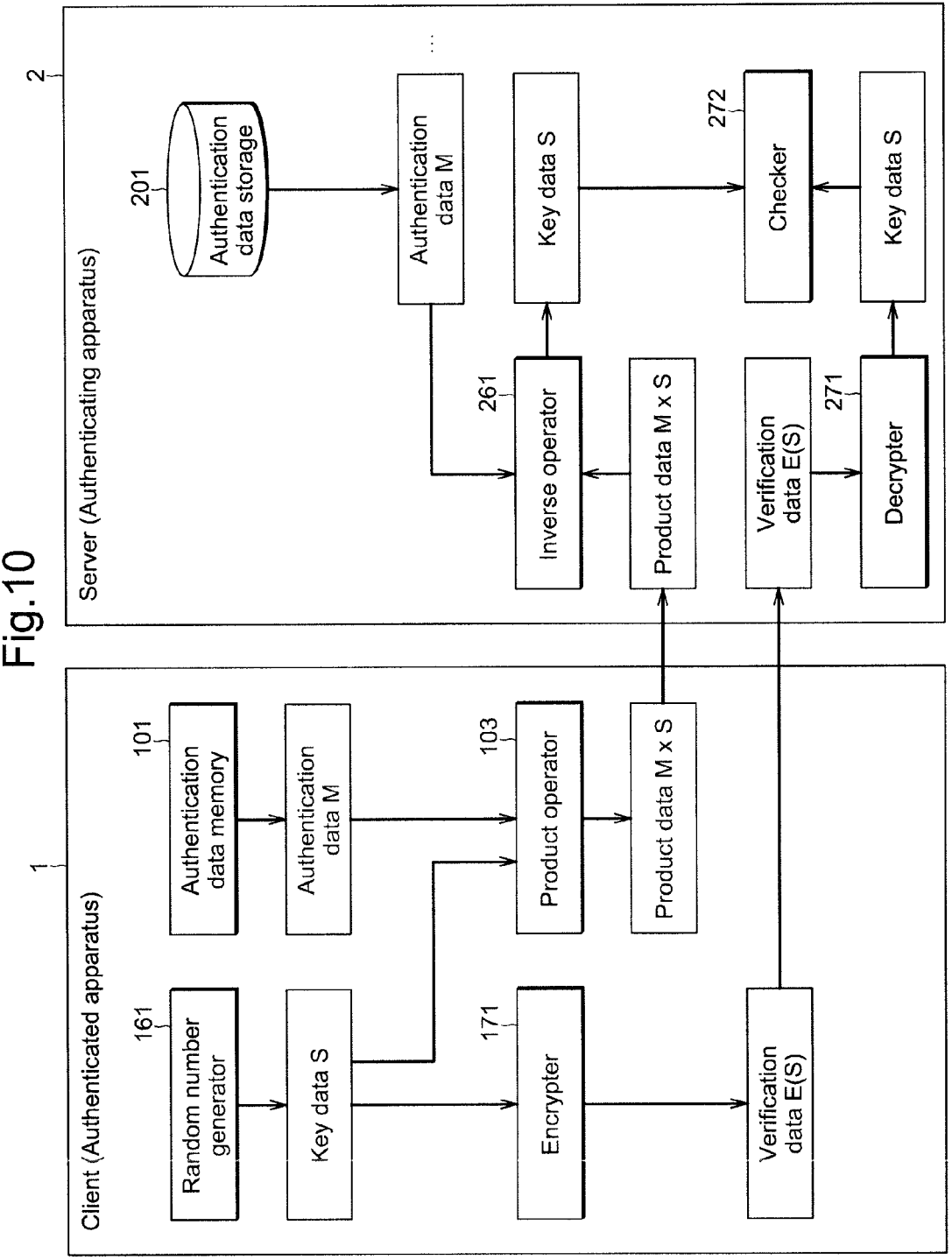
FIG. 10 is a block diagram of a ninth embodiment of the client and server configuring the secret authentication system according to the present invention.

FIG. 10 is a block diagram of a ninth embodiment of the client and server configuring the secret authentication system according to the present invention. In FIG. 9, verification data generator 104 of client 1 and verification data generator 204 of server 2 separately generate verification data F (S) using the key data S, and checker 205 of server 2 compares these verification data F (S) so as to determine genuineness of the key data S. In FIG. 10, client 1 has encrypter 171 that encrypts the key data S using the public key of server 2. The encrypted key data E (S) generated by encrypter 171 and the product data M×S are transmitted to server 2. Server apparatus 2 has decrypter 271 and checker 272. Decrypter 271 decrypts the encrypted key data E (S) received from client 1 using its own private key. Checker 272 determines genuineness of the key data S by comparing the key data S obtained by decrypter 271 to the key data S calculated by inverse operator 261. Other configurations are the same as those of the embodiment shown in FIG. 9.

Inverse operator 261 sequentially reads authentication data M out of authentication data storage 201. Checker 272 determines whether the authentication is successful. When the key data S obtained by decrypter 271 matches the key data S calculated by inverse operator 261, the authentication is successful. When they do not match, the next authentication data M is read out of authentication data storage 201 and undergoes the same processes. When there is no matching data, the authentication fails.

In this configuration, even when intermediary 3 has intercepted the product data M×S and encrypted key data E (S) that are transmitted from client 1 to server 2, intermediary 3 is not able to calculate the key data S from the encrypted key data E (S) without the private key of server 2. Without the key data S, the authentication data M cannot be calculated from the product data M×S. In addition similar to the embodiment shown in the FIG. 7, the forward secure scheme is enabled.

(Example of Random-Number-Key-Type Interactive Authentication)

Figure 11:
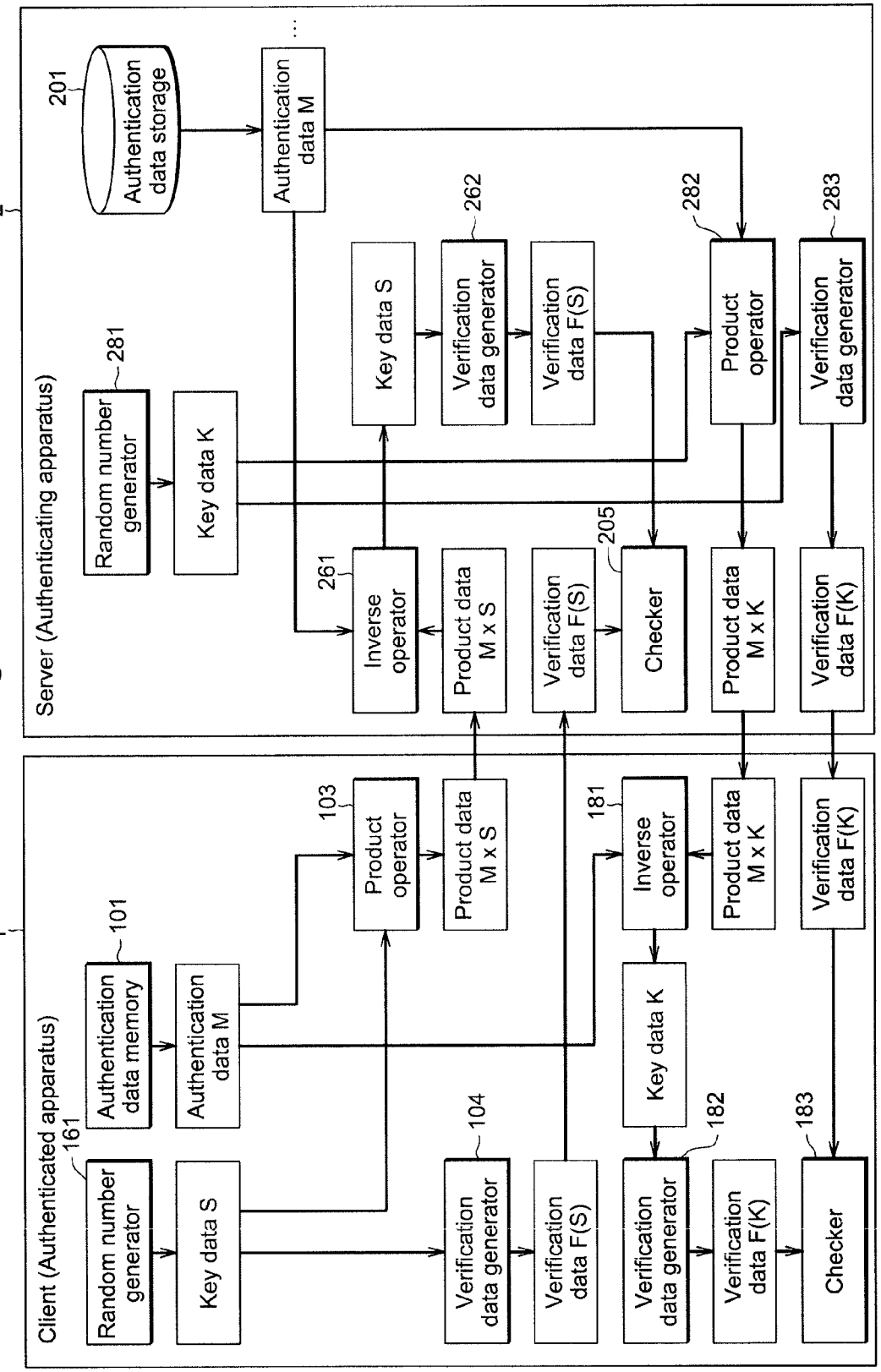
FIG. 11 is a block diagram of a tenth embodiment of the client and server configuring the secret authentication system according to the present invention.

FIG. 11 is a block diagram of a tenth embodiment of the client and server configuring the secret authentication system according to the present invention. Herein, in addition to the configuration shown in FIG. 9, server 2 has random number generator 281, product operator 282, and verification data generator 283. Random number generator 281 generates the key data K using random numbers. Product operator 282 generates the product data M×K by multiplying the authentication data M, which has been successfully authenticated by checker 205, by the key data K generated by random number generator 281. Verification data generator 283 generates the verification data F (K) through an operation that converts the key data K generated by random number generator 281 using a one-way function. The verification data F (K) generated by verification data generator 281 and the product data M×K generated by product operator 282 are transmitted to client 1.

Client apparatus 1 has inverse operator 181, verification data generator 182, and checker 183. Inverse operator 181 calculates the key data K by multiplying the product data M×K received from server 2 by an inverse number of the authentication data M in authentication data memory 101. Verification data generator 182 generates the verification data F (K) through an operation that converts the key data K calculated by inverse operator 181 using a one-way function. Checker 183 determines genuineness of the key data K by comparing the verification data F (K) generated by verification data generator 182 to the verification data F (K) received from server 2.

This configuration allows client 1 to verify authenticity of server 2, and hence interactive authentication is enabled.

(Exemplary Application to Monitor System)

Figure 12:
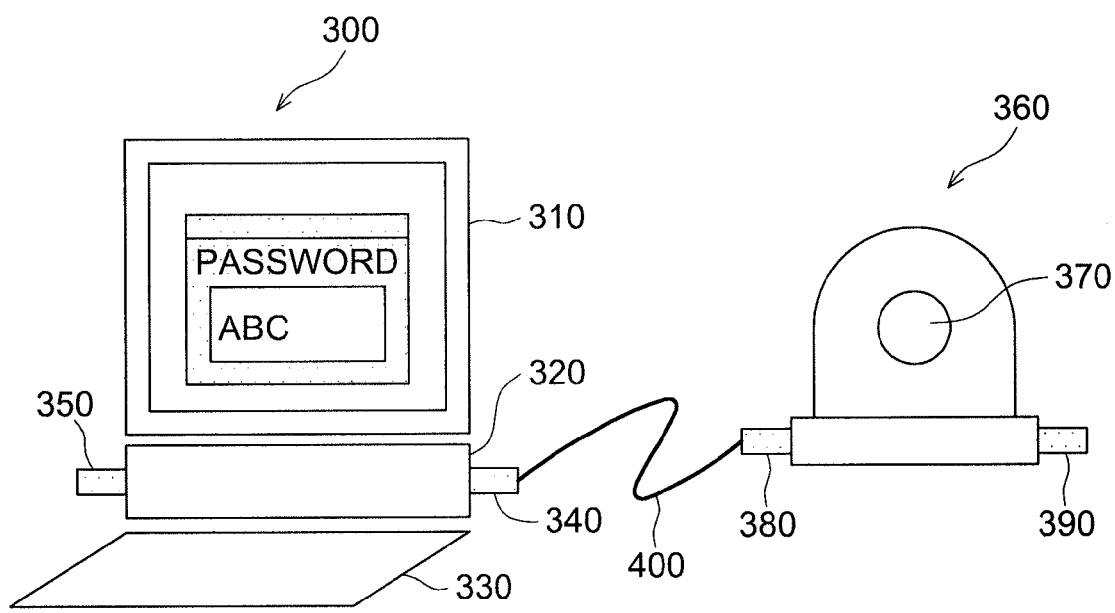
FIG. 12 is a configuration diagram of a monitoring system using the secret authentication system according to the present invention.
Figure 13:
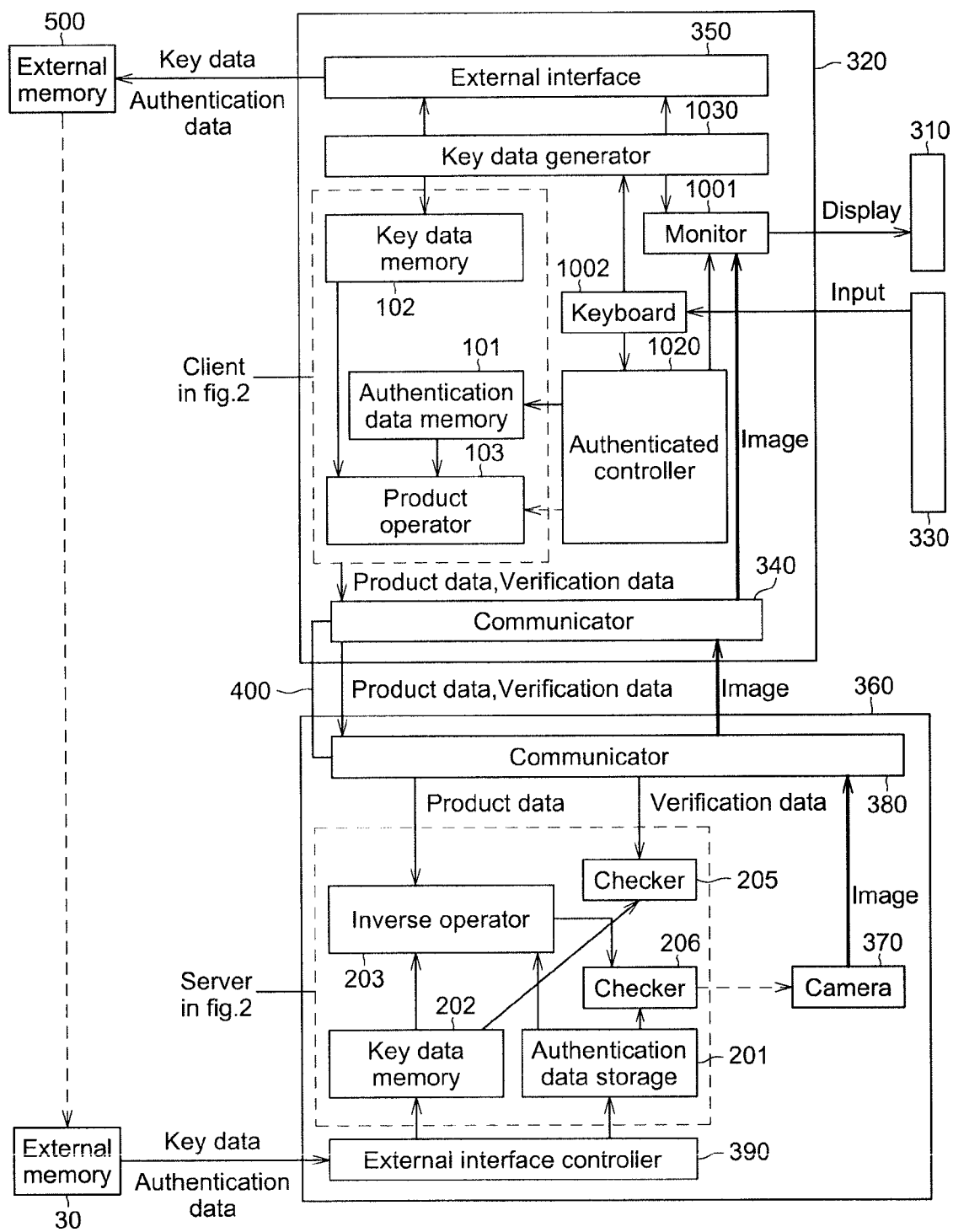
FIG. 13 is a configuration block diagram of the monitoring system using the secret authentication system according to the present invention.

FIG. 12 illustrates a monitor system using a secret authentication system according to the present invention. In FIG. 12, PC 300, which serves as an authenticated apparatus, includes monitor 310, PC main body 320, keyboard 330, PC communicator 340, and external interface 350. Monitor 310 displays a password input screen of an authenticated program. PC main body 320 includes a CPU that operates the authenticated program, and a memory. Keyboard 330 allows a user to enter a password. PC communicator 340 performs network communication. External interface 350, which is a USB interface and the like, transmits and receives data with an external memory. Further, IP camera 360 for monitoring includes camera 370; IP camera communicator 380 that performs network communication, similar to PC communicator 340; and external interface 390. Network cable 400 is shown in the figure, but is unnecessary for wireless communication. FIG. 13 is a block diagram of the monitor system shown in FIG. 12. Similar to FIG. 12, FIG. 13 shows monitor 310 that displays the password input screen of the authenticated program; PC main body 320 that includes the CPU that operates the authenticated program, and the memory; keyboard 330 that allows a user to enter a password; PC communicator 340 that performs network communication; and external interface 350, which is a USB interface and the like, that transmits and receives data with an external memory. Similar to FIG. 12, FIG. 13 further shows IP camera 360 for monitoring; camera 370; IP camera communicator 380 that performs network communication; external interface 390; and network cable 400. First, key data generator 1030 is started up. Then, key data generator 1030 displays on monitor 1001 a screen prompting a user to enter authentication data to be used. When the user enters the authentication data from keyboard 330, key data generator 1030 generates a random number and stores in key data memory 102 the random number as key data associated with the authentication data. Concurrently, the authentication data and key data are stored in external memory 500 through external interface 350. Subsequently, the user inserts external memory 500 into external interface 390 of IP camera 360. External interface 390 stores authentication data m' in server authentication data storage 201 and function data X' in server function data memory 202, such that the authentication data m' and function data X' are associated. After the operations above are completed, authenticated controller 1020 is started up. Authenticated controller 1020 displays on monitor 1001 a screen prompting the user to enter the authentication data. When the user enters authentication data m from keyboard 330, authenticated controller 1020 stores the authentication data m in client authentication data memory 101, and instructs product operator 103 to perform a series of authentication operations. Product operator 103 reads out the authentication data m from client authentication data memory 101, and retrieves the key data associated with authentication data m from key data memory 102. As shown in FIG. 5, PC 320 then transmits product data and verification data F to IP camera 360 through PC communicator 340. When IP camera 360 receives function data S and the verification data F through IP camera communicator 380, IP camera 360 performs authentication at checker 205, as shown in FIG. 5 by using the key data and authentication data m', which are associated and stored in server key data memory 202 and server authentication data storage 201, respectively. When the authentication is successful, checker 206 activates camera 370. Then, camera 370 transmits recorded image data to PC 320 through IP camera communicator 380. PC 320 receives the image data through PC communicator 340, transfers the image data to monitor 1001, and then displays the data on monitor 310.

The secret authentication system according the present invention reduces operation loads, and hence costs, while ensuring high secrecy and is useful where authentication is performed by secretly transmitting authentication data from an authenticated apparatus to an authenticating apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A secret authentication system comprising:
a client and
a server authenticating the client, wherein
the client comprises:
a client authentication data memory that stores client authentication data M indicative of authenticity of the client,
a client key data memory that stores client key data S encrypting the client authentication data M stored in the client authentication data memory,
a client encrypter performing an operation on the client authentication data M stored in the client authentication data memory and the client key data S stored in the client key data memory so as to output client encrypted data M×S, and
a client verification data generator generating client verification data F (S) through an operation converting the client key data S stored in the client key data memory using a one-way function; and
a transmitter that transmits the client verification data F (S) and the client encrypted data M×S to the server; and
the server comprises:
a server authentication data storage that stores server authentication data M' corresponding to each of the client authentication data M assigned to each client of a number of clients,
a sever key data memory that stores server key data S' corresponding to each of the client key data S assigned to each client of a number of clients,
a server verification data generator generating server verification data F (S)' through an operation converting the server key data S' stored in the server key data memory using a one-way function identical to that used by the client verification data generator,
a server key data checker comparing the server verification data F (S)' generated by the server verification data generator to the client verification data F (S) received from the client, and verifying whether the client key data S matches the server key data S',
a server inverse operator generating the client authentication data M by multiplying the client encrypted data M×S by an inverse number $S'^{-1}$ of the server key data S' stored in the server key data memory, in response to a determination that the client key data S matches the server key data S' based upon the comparison performed by the server key data checker, and
a server authentication data checker verifying whether the client authentication data M generated by the server inverse operator matches the server authentication data M' stored in the server authentication data storage.

2. The secret authentication system according to claim 1, the server being configured to verify authenticity of the client by unidirectional transmission of verification data from the client to the server.

* * * * *